Patented Nov. 2, 1926.

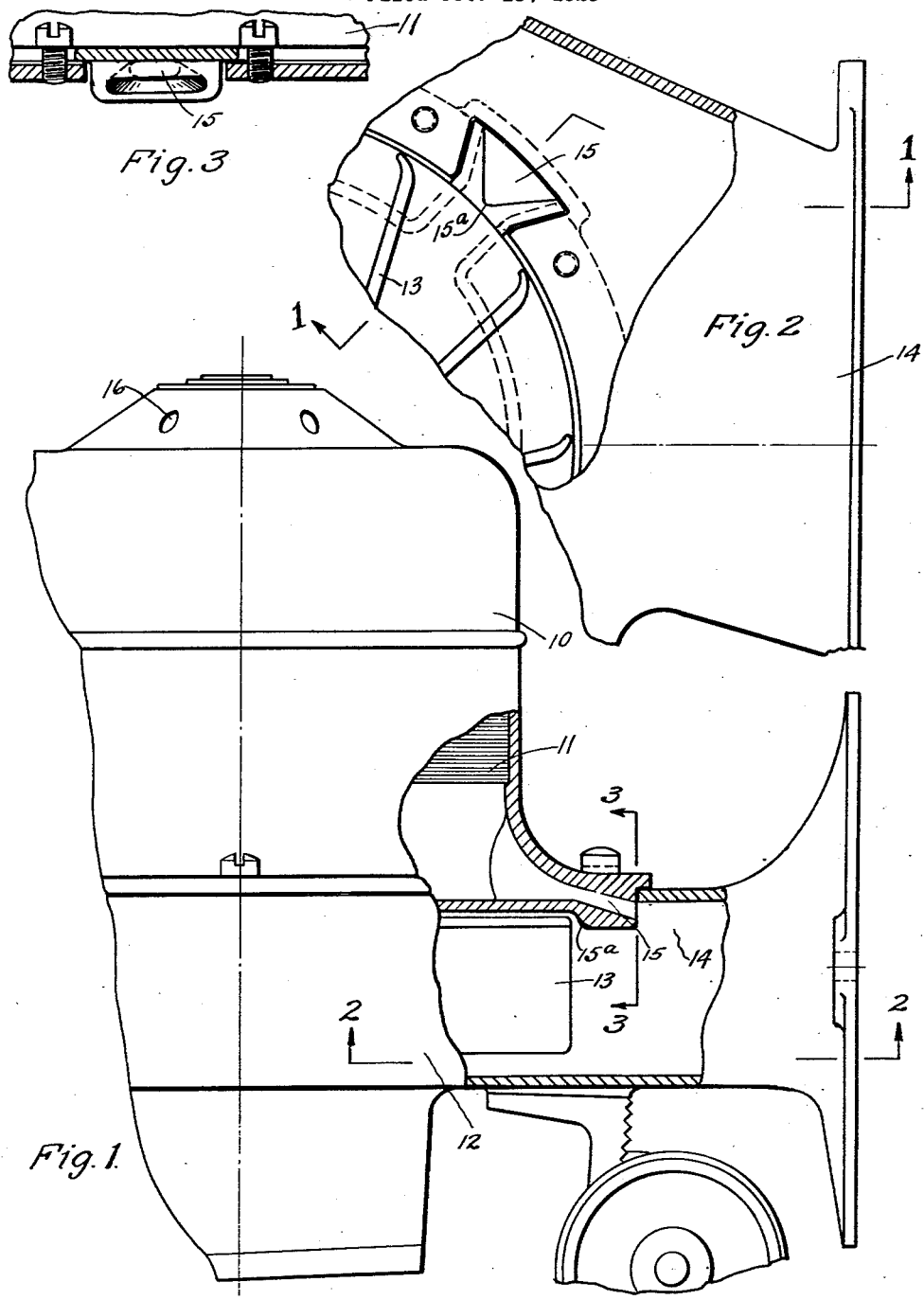

1,605,586

UNITED STATES PATENT OFFICE.

HOWARD EARL HOOVER, OF GLENCOE, ILLINOIS, ASSIGNOR TO THE HOOVER COMPANY, OF NORTH CANTON, OHIO, A CORPORATION OF OHIO.

MEANS FOR COOLING ELECTRIC MOTORS.

Application filed October 15, 1923. Serial No. 668,471.

My invention relates to the air cooling of electric motors and in particular to the air cooling of those electric motors employed for driving centrifugal fans where the electric motor and fan are positioned closely adjacent.

The object of this invention is the production of an inexpensive and efficient means for interiorly air cooling relatively small high speed electric motors such as are employed with mechanisms of various characters. It is, of course, understood that the invention is not limited to such motors as are used with portable apparatus, but may also be employed in connection with motors used to drive stationary apparatus.

The means which I employ according to my invention constitutes structure wherein the current of air created by the fan in turn causes a flow of air through the motor, the cooling current of air discharging otherwise than through the fan chamber.

It is, of course, well known to those skilled in the art of high speed fractional horse power electric motors that, in an attempt to design smaller and lighter motors, the size of the conductors must be decreased and in many instances they have been decreased to such an extent that on any continuous running of the motor excessive heating is caused, which, in turn, frequently causes loosening of the wires within the motor, charring of the insulation, and all manner of electrical trouble.

It is also known that considering a motor of a certain horse power and weights without air cooling, a motor of like horse power but of less weight may be designed due to allowable decrease in size of the conductors used, if there is provision made for cooling the motor so as to keep the temperature within allowable limits during the operation thereof.

Electrical motors of this type, which are often used in dirty or dusty places are ordinarily almost entirely enclosed in a suitable casing which also prevents foreign material from becoming entangled with the rapidly revolving armature.

Another advantage of a construction in which a current of air is caused to pass through the enclosing casing of the motor is that due to constant wear of the carbon brushes upon the commutators there accumulates within the housing fine dust-like particles of copper and carbon, which accumulations may cause an arcing of the current between individual sections of the commutator. This difficulty is of course obviated by the employment of my improved air cooling means, in which a current of air which is caused to flow through the housing, carries away such particles, not allowing them to accumulate, and thus such arcing is prevented.

Other objects and advantages of the structure are hereinafter set forth in detail and will be apparent to persons skilled in the art to which the invention relates and to these advantages in so far as they may be patentably novel I lay claim the same as hereinafter set forth.

The preferred form of my invention is particularly illustrated in the accompanying drawing, which forms part of this application for Letters Patent, and whereon corresponding numerals refer to like parts in the several different views.

Fig. 1 represents a partial side elevation of an electric motor embodying my invention, a portion being broken away for the purpose of clear illustration, the parts broken away being shown in section taken on line 1—1 of Fig. 2, Fig. 2 is a section taken on line 2—2 of Fig. 1, Fig. 3 is a section taken on line 3—3 of Fig. 1.

Referring to the drawing, it will be seen that there is provided a motor housing indicated at 10 within which is mounted an electric motor 11, a small portion only of a field pole showing since the construction of the motor per se is not of the essence of my invention. The motor housing 10 is mounted on fan housing 12 within which is located a centrifugal fan 13. There is provided, as at 14, a discharge from the centrifugal fan through which air drawn in through the inlet is discharged through the action of the fan 13. It has been found that in the designing of the discharge for such centrifugal fans that, for practical reasons, it is almost impossible to design them for a maximum efficiency through the entire discharge, that is, due to manufacturing difficulties there are certain portions in which due to the direction of air flow and the particular construction of the discharge, eddies are formed in which there is a zone of more or less lowered pressure.

It is also well known that by locating a nozzle in the stream of flow of a liquid or gas, and directed in the direction of flow, that there will be created an ejector action or a lowering of pressure in the nozzle which will cause the stream of air or other medium to flow from the nozzle in the direction of flow of the main stream in which the nozzle is placed.

In my invention I have taken advantage both of the zone of lowered pressure and of the ejector action of a nozzle placed in a current as described. This nozzle is indicated in the drawings at 15 and communicates with the interior of the motor housing 10, as is clearly shown.

This nozzle 15 is formed with a more or less stream line exterior, that is, the heel portion is rounded and narrow as at 15ª and diverges in the direction of flow of the main stream.

By providing openings 16 in the upper portion of the motor housing, it is clearly apparent that on starting the electric motor which drives the fan 13, that due to this deficiency in pressure and the ejector action of the nozzle, a current of air will be caused to enter the motor housing 10 at 16, traverse the interior of the housing and discharge at 15 into the main stream of air discharging from centrifugal fan 13.

Thus it will be seen that I have provided by my invention a very simple means by which a light high speed electrical motor may be air cooled and which is without mechanism of any sort to get out of order. It is to be noted that the cooling of the motor is automatic, that is, as soon as the motor is started, the current of air is drawn through the housing and then as soon as the motor is stopped since the conditions that cause the air flow no longer exists, the air flow through the motor will then also cease.

Having now fully described my invention and the manner in which it may be applied, I desire to obtain patent protection on the structure defined in the appended claims.

I claim:—

1. Means for cooling an electric motor having associated therewith a flow of medium, comprising a substantially closed motor enclosing housing, inlet openings in the housing at one end and a nozzle communicating with the housing at the other end thereof positioned in said stream of medium and directed in the direction of flow of said medium.

2. In a structure for cooling an enclosed electric motor, having associated therewith a flow of medium, a housing enclosing the motor, apertures adjacent one end of the housing for admission of cooling medium and means adjacent the other end of the housing to cause a current of cooling medium to flow through said housing, said last mentioned means comprising an ejector nozzle communicating with said housing and positioned in said first mentioned stream of flow of medium and directed in the direction of flow of said medium.

3. An air cooled electric motor comprising an enclosing housing for said motor, a pump operated by said motor, a discharge for said pump, apertures in one end of said housing, and an ejector nozzle communicating with said housing, the ejector nozzle being positioned in the pump discharge.

4. Means for causing a flow of medium over mechanism enclosed within a housing comprising an inlet for medium into said housing, an outlet from said housing terminating in an ejector nozzle and means comprising an independent member creating a flow of medium past the ejector nozzle.

5. In a motor driven blower the combination with a pump chamber having a discharge, and a motor case having no direct communication with said pump chamber, of an air inlet to said motor case, and an outlet from said motor case comprising an air passage around said pump chamber into said discharge.

6. In a motor driven blower the combination with a pump chamber having a discharge, and a motor casing for said motor, the latter having no direct communication with said pump chamber, of air inlets to said motor case and an outlet therefrom having no direct communication with the pump chamber comprising an air passage terminating in an ejector nozzle located in said discharge.

7. In a motor driven blower, the combination of a motor casing, a fan casing having an inlet and a discharge, a motor mounted in the motor casing, a fan mounted in the fan casing and driven by the motor, an air inlet to the motor casing, and an air outlet from the motor casing located in the fan discharge to cause air entering such air inlet to be drawn through the motor chamber and discharge into the fan discharge.

8. In a motor driven blower, the combination of a motor casing, a fan casing having an inlet and a discharge, a motor mounted in the motor casing, a fan mounted in the fan casing, and driven by the motor, an air inlet to the motor casing, and an outlet from the motor casing so located that air discharged therefrom does not pass through the fan casing, the flow of air through the motor casing being induced by the air current created by the fan.

Signed this 2nd day of October, 1923, in Chicago, in the county of Cook and State of Illinois.

HOWARD EARL HOOVER.